July 1, 1958     L. B. SCHUMACHER     2,841,094
SYSTEM OF TRANSPORTING HIGHWAY VEHICLES BY RAIL
Filed April 12, 1955     3 Sheets-Sheet 1
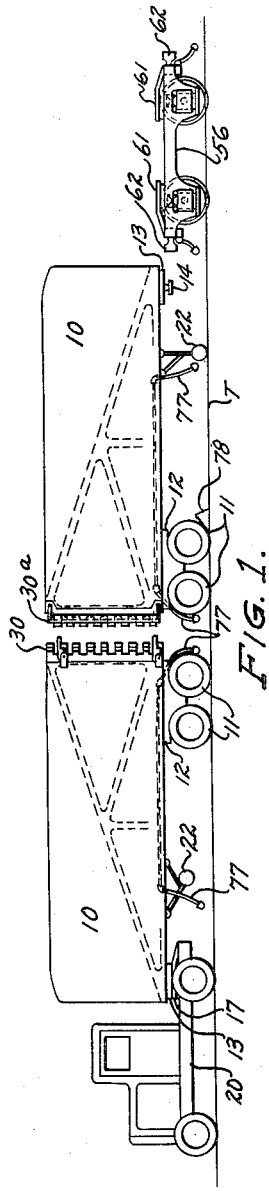
INVENTOR
Lew B Schumacher July 1, 1958   L. B. SCHUMACHER   2,841,094
SYSTEM OF TRANSPORTING HIGHWAY VEHICLES BY RAIL
Filed April 12, 1955   3 Sheets-Sheet 2

INVENTOR
Leon B. Schumacher

July 1, 1958      L. B. SCHUMACHER      2,841,094
SYSTEM OF TRANSPORTING HIGHWAY VEHICLES BY RAIL Filed April 12, 1955      3 Sheets-Sheet 3

INVENTOR
Leon B. Schumacher

United States Patent Office 2,841,094
Patented July 1, 1958

2,841,094

SYSTEM OF TRANSPORTING HIGHWAY VEHICLES BY RAIL

Leon B. Schumacher, Dayton, Ohio

Application April 12, 1955, Serial No. 500,767

8 Claims. (Cl. 105—159)

This invention relates to the transportation of freight and consists particularly in means for moving highway semi-trailers by rail.

Conventional methods of handling highway trailers for shipment by rail usually involve supporting the trailer on a flat car, either of standard or special design. This has a number of disadvantages, a principal one being that unless a special flat car is provided, either with wheel wells or a depressed deck portion, the larger trailers will exceed clearance limits on many railroads. Moreover, all such arrangements raise the center of gravity to a level where safe operation on curves at high speeds is impossible due to the large overturning moment. A further disadvantage is the dead weight which must be moved—the heavy flat car, with its necessarily heavy trucks to suppport semi-trailers of relatively light construction. Attempts have been made in the past to obviate these disadvantages by providing the trailers with fifth wheels at each end and mounting them on railroad trucks.

An object of my invention is to provide a system for handling highway trailers by rail, in which the usual supporting car structures are made unnecessary by mounting the trailers directly on railway trucks, with consequent reduction in weight and lowering of the center of gravity.

A further object is to reduce the number of railway trucks required to support a given number of trailers.

A still further object is to eliminate the second fifth wheel required when a single trailer is mounted at each end on a railway truck.

An additional object is to provide means for rigidly securing two trailers together, rear to rear, to form a rigid structure capable of supporting its own weight and that of its lading, and of withstanding buff and draft forces incident to train operation.

Another object is to provide a fast, simple method of assembling trains of this type.

I accomplish these and other objects by providing a highway semi-trailer of generally conventional construction with reinforced side framing and means for locking the rear ends of each side frame together to form a continuous truss capable of supporting the combined weight of the two connected trailers and of withstanding the buff and draft forces of train operation. Railway trucks provided with a pair of longitudinally spaced fifth wheel supports similar to those on highway tractors are then pushed under the ends of the connected trailers, thus raising the highway wheels of the trailer from the level of the track surface. The car thus formed is pushed until one of the railway truck fifth wheel supports engages the fifth wheel on a second pair of connected trailers; a similar railway truck is connected to the other end of the second pair of trailers, and the process is repeated until a train of desired length has been made up.

Other objects and advantages of the invention will appear as the description proceeds with reference to the accompanying drawings in which, Figure 1 is a side elevation of a highway tractor and a pair of trailers constructed in accordance with my invention.

Figure 2 is a side elevation of a pair of connected trailers supported on railroad trucks.

Figure 3 is a plan view corresponding to Figure 2.

Figure 4:
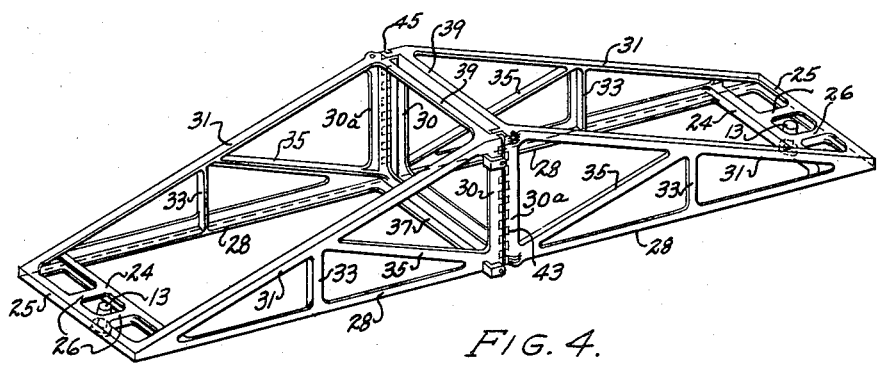
Figure 4 is a perspective view of the main framing of a pair of connected trailers.
Figure 11:
Figure 11 is a partial vertical sectional view of the device shown in Figure 5.
Figure 6:
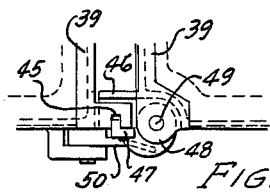
Figure 6 is a top view of the device shown in Figure 5.
Figure 5:
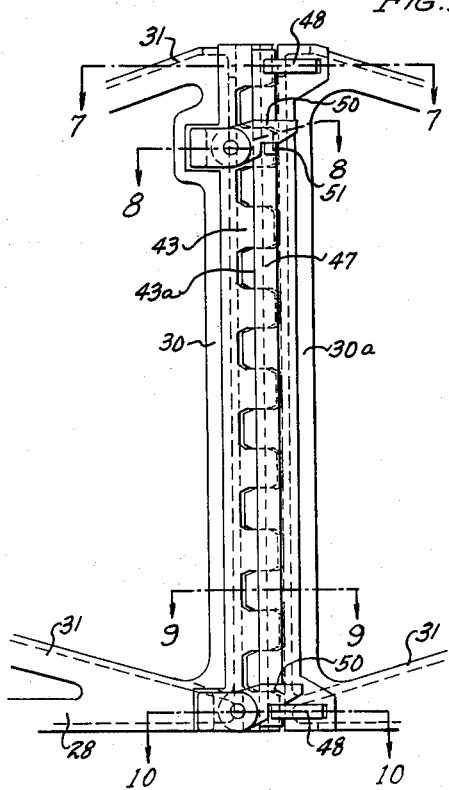
Figure 5 is a detailed view of the device used for securing the trailers to each other.
Figure 7:
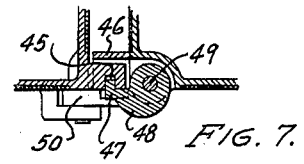
Figures 7–10 are horizontal sectional views along lines 7—7, 8—8, 9—9, and 10—10, respectively, of Figure 5.
Figure 8:
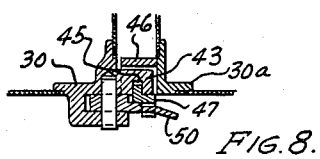
Figure 9:
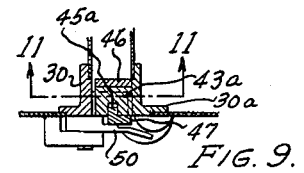
Figure 10:
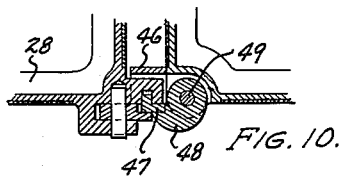

Referring now to the drawings, the reference numeral 10 refers to a highway semi-trailer body of generally conventional form, supported near its rear end on wheels 11 by tandem axle structure 12, and provided at its front end with a fifth wheel 13 which has the usual kingpin 14. Fifth wheel 13 is secured to the body framing of the trailer and is adapted to rest on the usual cooperating fifth wheel support 17 on the rear portion of the chassis of highway tractor 20. To transmit tractive forces from tractor to trailer, and to prevent vertical separation therebetween fifth wheel support 17 is provided with a lock for detachably securing the king pin 14 in the fifth wheel support. For supporting the front end of semi-trailers 10 at such times as they may be detached from the tractor 20, the usual retractable wheeled supports 22 are secured to the trailer bodies. From the foregoing, it is evident that the semi-trailers described are adaptable for highway operation in the conventional manner.

I provide additional features to adapt semi-trailers for rail operation. To permit a pair of trailers to be joined, back-to-back, to form a strong rigid unit, supported at its ends, and capable of operation in train service, I provide additional body framing, as best seen in Figure 4, in which the front frame assemblies, consisting of a pair of longitudinally spaced transversely extending members 24 and 25 connected by short longitudinal sills 26, are rigidly secured to fifth wheel 13. The side framing of each semi-trailer body includes half of a truss consisting of side sill 28, the rear corner post 30 and 30a, a diagonal member 31, an intermediate vertical member 33, and an intermediate diagonal member 35. At their rear ends the trusses on opposite sides of each semi-trailer are joined at the bottom by rear end sills 37 and top cross-beams 39, thus forming a structure of considerable rigidity and strength.

The corner posts 30 and 30a, as shown in detail in Figures 5 to 11, are each provided, respectively, with a series of vertically arranged teeth 43 and 43a adapted to mesh with registering teeth on the corresponding corner post of an adjacent trailer, and the teeth are formed with registering vertical grooves 45 and 45a in their outer surfaces to receive a locking bar 47. For aligning the teeth laterally, a vertical plate 46 is formed integral with the teeth 43a and is adapted to abut the inner surfaces of teeth 43 when the trailer bodies are joined. Locking bar 47 is of angle section and is provided at its upper and lower ends with offset hinges 48, which are pivotally secured at 49 in recesses in the corner post, so that the bar may be easily swung into or out of engagement with grooves 45 and 45a. For retaining locking bar 47 in the grooves 45 and 45a, a pair of dogs 50 is pivotally secured to corner post 30 so that when rotated to the horizontal they overlie angle bar 47, thereby preventing its removal from the aligned grooves. A boss 51 is provided on corner post 30a to support the upper dog 50 in the horizontal locking position; the lower dog is supported on bottom hinge 48. The teeth are pitched to permit easy inter-engagement between trailers even though their floor heights may vary slightly due to variation in loading, and the relative vertical position of the teeth on opposite corners of the trailers is alternated to permit any two trailers so equipped to be joined. Adjacent trailers can thus be secured together, by aligning them longitudinally back to back, backing them together so that the teeth 43 and 43a fully mesh, and the vertical grooves are in complete registry, then swinging locking bar 47 into engagement with the grooves, where it is locked by means of dogs 50. Relative lateral movement between connected trailer bodies is prevented by engagement of plate 46 with the inner surfaces of teeth 43.

Figure 12:
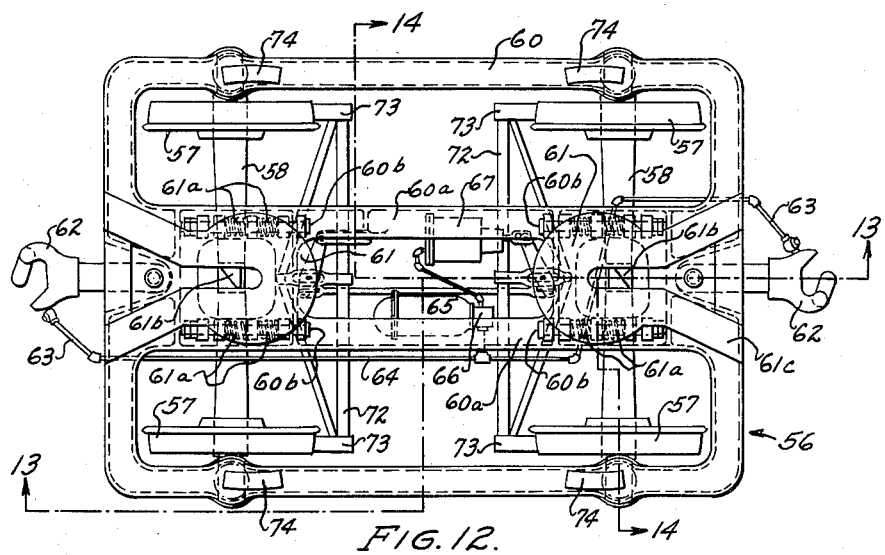
Figure 12 is an enlarged plan view of one of the railroad trucks illustrated in Figures 2 and 3.
Figure 13:
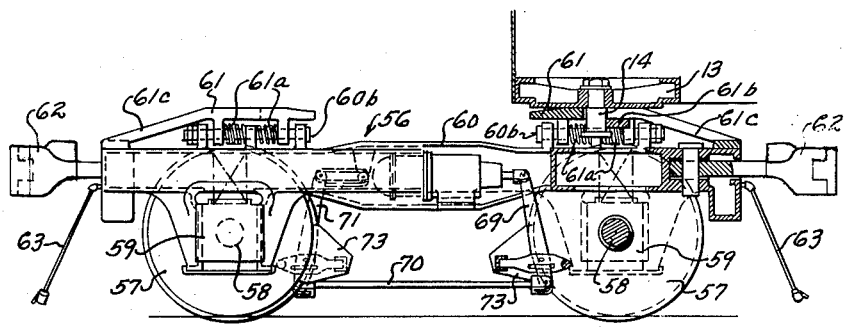
Figure 13 is a combination side elevation and longitudinal vertical sectional view along the line 13—13 of Figure 12.
Figure 14:
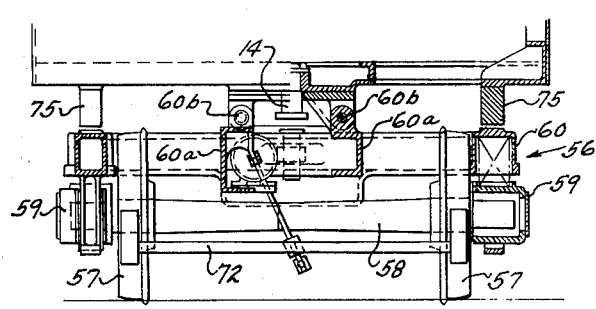
Figure 14 is a transverse vertical sectional view along the line 14—14 of Figure 12.

Railway trucks 56 are provided, for the dual purpose of supporting the ends of the connected trailers, as described above, and also of providing a draft connection between adjacent two-trailer units, and between two-trailer units and standard railway cars and locomotives. As best seen in Figures 12–14, trucks 56 may be of any suitable type including wheels 57, axles 58, journal boxes 59, and a frame 60 spring supported on the journal boxes. Frame 60 is rectangular in plan and includes a pair of longitudinally extending intermediate beams 60a which carry four longitudinally extending fixed horizontal rods 60b. Fifth wheel supports 61 similar to conventional fifth wheel support 17 on highway tractor 20 are slidably mounted on rods 60b for slight movement in both directions longitudinally of the frame. Springs 61a are mounted on rods 60b between depending elements of supports 61 and upstanding elements on beams 60a in order to yieldably resist relative longitudinal movements between fifth wheel support and truck frame and thereby absorb draft and buff shocks. The fifth wheel supports 61 include king pin locks 61b, similar to those of the tractor fifth wheel supports, and are at a somewhat higher level than corresponding supports on the highway tractor to ensure that when positioned under semi-trailers, the semi-trailer highway wheels will clear the track sufficiently to permit safe operation. For raising the trailer to the higher level and for guiding the king pin into locking position, supports 61 are provided with integral inclined converging members 61c.

Trucks 56 are also equipped with AAR type automatic couplers 62 to permit them to be connected to each other or to other railroad rolling stock, and are also provided with air and hand brake equipment, including air hoses 63, piping 64, reservoir 65, triple valve 66, brake cylinder 67, and conventional truck brake rigging including live lever 69, connecting rod 70, dead lever 71, and brake beams 72 mounting shoes 73.

Trucks 56 are also provided with side bearing portions 74 which are adapted to cooperate with vertically aligned side bearings 75 to stabilize the bodies laterally on the trucks.

Each of the semi-trailers 10 is provided with air piping 76 and flexible air hoses 77 at each end, to provide a connection between the brake systems of railway trucks 56 so as to permit simultaneous operation of air brakes on the trucks from a locomotive cab.

Operation of this system is as follows: A semi-trailer 10 is spotted on a paved section of railway track, as shown at the right in Figure 1, its retractable supports 22 are lowered, and it is blocked against movement by a chock block 78. A second trailer is backed into engagement with the trailer previously spotted, and the trailers are locked together, as described above. Retractable support 22 is lowered, the tractor is disconnected, and trucks 56 are then pushed by tractors 20 or locomotives such as that shown at 79, as may be desired, under opposite ends of the connected two-trailer unit, the sloping surfaces of the fifth wheel supports 61 on the trucks raising the trailer ends until the fifth wheel and cooperating supports are in registry with each other and locked together. If desired, the trackway may be provided with loading ramps, as shown in Patent No. 1,786,463, to Thomas, for raising the semi-trailers to the level of the railway truck fifth wheel supports. A second pair of trailers are similarly joined, a truck is pushed under the distant end of the second two-trailer unit, and the first unit is pushed toward the second unit until the free fifth wheel support 61 becomes coupled to the fifth wheel on the adjacent end of the second unit. This operation is repeated until a train of desired length, is made up. A locomotive is then coupled to an end truck, the air lines are connected, and the train is started towards its destination. It will be understood that by utilizing relatively short trains, consisting only of a locomotive, trailer units as described, and a caboose when necessary, high operating speeds with consequent high terminal-to-terminal average speeds can be achieved, and, because of the shortness of the trains, the relatively light framing and relatively low capacity couplings of conventional semi-trailers, modified as described herein is sufficient.

It will be clear to those skilled in the art that modifications may be made in the details of my invention without departing from the spirit thereof and accordingly, I do not wish to be limited in any manner other than by the scope of the claims appended hereto.

I claim:

1. A railway vehicle body consisting of two highway semi-trailer bodies each having girder-like sidewalls, and means on the rear end of each sidewall for detachably securing said bodies to each other back-to-back, said securing means comprising a toothed vertical member rigidly secured to the rear end of each sidewall and extending substantially the full height of said sidewall and detachably engaged with a cooperating similar member on the other said semi-trailer body.

2. A railway vehicle body consisting of two highway semi-trailer bodies each having sidewalls including truss framing, said truss framing including a rear end post, and means on each said rear end post for detachably securing said semi-trailer bodies to each other in back-to-back relation, said securing means comprising a toothed vertical member rigidly secured to the rear end of each of said rear end posts and extending substantially the full height of said end posts and detachably engaged with a cooperating similar member on the other semi-trailer body, and a releasable locking device for retaining said toothed members on connected semi-trailer bodies in engagement with each other.

3. A vehicle body consisting of two highway semi-trailer bodies, and means on the rear end of each of said semi-trailer bodies detachably securing said bodies to each other back-to-back, said securing means comprising a pair of toothed vertical members on the rear end of each of said semi-trailer bodies and detachably engaged with cooperating similar members on the other semi-trailer body, said engaged toothed members being formed with vertically aligned recesses having transverse wall portions, and a vertically extending member in said recesses to prevent disengagement of said engaged toothed members, said vertically extending member being horizontally removable from said recesses.

4. A vehicle body consisting of two highway semi-trailer bodies, and means on the rear end of each of said semi-trailer bodies detachably securing said bodies to each other back-to-back, said securing means comprising a pair of toothed vertical members on the rear end of each of said semi-trailer bodies and detachably engaged with cooperating similar members on the other semi-trailer body, said engaged toothed members being formed with vertically aligned recesses having transverse wall portions, and a vertically extending member in said recesses to prevent disengagement of said engaged toothed members, said toothed members having surfaces extending longitudinally of the vehicle body to align said semi-trailer bodies transversely, said vertically extending member being horizontally removable from said recesses.

5. A vehicle body consisting of two highway semi-trailer bodies, said bodies each having side wall framing consisting of a portion of a truss, and means on the rear end of each said semi-trailer body securing said bodies to each other back-to-back, said securing means comprising a pair of toothed vertical members forming the rear end of each of said truss portions and detachably engaged with cooperating similar members on the other of said semi-trailer bodies, said engaged toothed members being formed with vertically aligned recesses having transverse wall portions, and a vertically extending member in said recesses to prevent disengagement of said engaged toothed members, said vertically extending member being horizontally removable from said recesses.

6. A vehicle body consisting of two highway semi-trailer bodies, and means on the rear end of each of said semi-trailer body securing said bodies to each other back-to-back, said securing means comprising a pair of toothed vertical members secured to the rear end of each of said semi-trailer bodies and detachably engaged with cooperating similar members on the other of said semi-trailer bodies, said engaged toothed members being formed with vertically aligned recesses having transverse wall portions, and a vertically extending member removably held in said recesses to prevent disengagement of said engaged toothed members, said vertically extending member having offset portions pivotally connected to one of said toothed members whereby said vertically extending member may be swung out of engagement with said aligned recesses.

7. A vehicle body consisting of two highway semi-trailer bodies, and means on the rear end of each said semi-trailer body securing said bodies to each other back-to-back, said securing means comprising a pair of toothed vertical members secured to the rear end of each of said semi-trailer bodies and detachably engaged with cooperating similar members on the other of said semi-trailer bodies, said engaged toothed members being formed with vertically aligned recesses having transverse wall portions, and a vertically extending member removably held in said recesses to prevent disengagement of said engaged toothed members, said vertically extending member having offset portions pivotally connected to one of said toothed members whereby said vertically extending member may be swung out of engagement with said aligned recesses, and means associated with one of said toothed members for retaining said vertically extending member in engagement with said slot.

8. A railway train comprising body units each consisting of a pair of highway vehicles rigidly secured to each other back-to-back, each of said highway vehicles having highway wheels secured beneath its rear end and a fifth wheel on its opposite end, and spaced disconnected railway trucks each having a pair of longitudinally spaced fifth wheel supports, each of said supports being detachably connected to and supporting a fifth wheel of an adjacent body unit and forming a draft connection between adjacent body units, said fifth wheel supports being at a level sufficiently high to elevate the highway wheels clear of railway track structure.

References Cited in the file of this patent

UNITED STATES PATENTS

| | | |
|---|---|---|
| 374,588 | Davis | Dec. 13, 1887 |
| 1,792,357 | Bonner | Feb. 10, 1931 |
| 1,911,771 | Reid | May 30, 1933 |
| 2,097,599 | Pavlecka | Nov. 2, 1937 |
| 2,432,396 | Earhart | Dec. 9, 1947 |
| 2,513,552 | Dove | July 4, 1950 |
| 2,564,311 | Rimailho | Aug. 14, 1951 |
| 2,709,969 | Andert | June 7, 1955 |